United States Patent [19]

Robison, deceased et al.

[11] 4,449,725

[45] May 22, 1984

[54] SUPPORT FOR BOOMS AND OTHER FIELD EQUIPMENT

[76] Inventors: William G. Robison, deceased, late of Jackson, Minn.; by Luann Robison, executrix, Box 16, Alpha, Minn. 56111

[21] Appl. No.: 261,917

[22] Filed: May 8, 1981
(Under 37 CFR 1.47)

[51] Int. Cl.³ .................. B60B 33/00; B62D 61/00
[52] U.S. Cl. .................................................. 280/78
[58] Field of Search .................. 239/159, 163–169, 239/172; 16/44; 280/78, 701, 724

[56] References Cited

U.S. PATENT DOCUMENTS 1,794,630  3/1931  Linn ........................... 280/78 X
3,107,055  10/1963  Palmer ........................... 239/164

*Primary Examiner*—Andres Kashnikow
*Attorney, Agent, or Firm*—Orrin M. Haugen; Thomas J. Nikolai

[57] ABSTRACT

A wheeled support, alone and in combination with an implement to be transported over the surface of the ground, the support including a caster wheel swivelled in a bracket, a platform for connection to the implement, and a spring and a shock absorber acting between the wheel bracket and the platform.

3 Claims, 3 Drawing Figures

SUPPORT FOR BOOMS AND OTHER FIELD EQUIPMENT

TECHNICAL FIELD

This invention relates to the field of transportation, and particularly to wheeled supports for field equipment to be moved over the surface of the ground, particularly in applications where the surface is unpaved and may be quite rough.

BACKGROUND OF THE INVENTION

There are numerous situations in which equipment is to be moved over the surface of rough ground, as in the fields of agriculture and road-building, for example. Accordingly, there is a need for wheeled supports which are capable of carrying items of medium weight, such as spraying booms, and yet will protect them in some degree from the shocks and vibration inherent in such applications.

BRIEF DESCRIPTION OF THE INVENTION

The present invention comprises a wheeled support to be secured to a boom or other object, the support including a platform, a caster wheel swivelled in a bracket, pivoted to the platform, and resilient and shock absorbing means acting between the wheel bracket and the platform.

Various advantages and features of novelty which characterize the invention are pointed out with particularity in the claims annexed hereto and forming a part hereof. However, for a better understanding of the invention, its advanges, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals indicate corresponding parts throughout the several views.

DESCRIPTION OF THE PREFERRED EMBODIMENT

Figure 1:
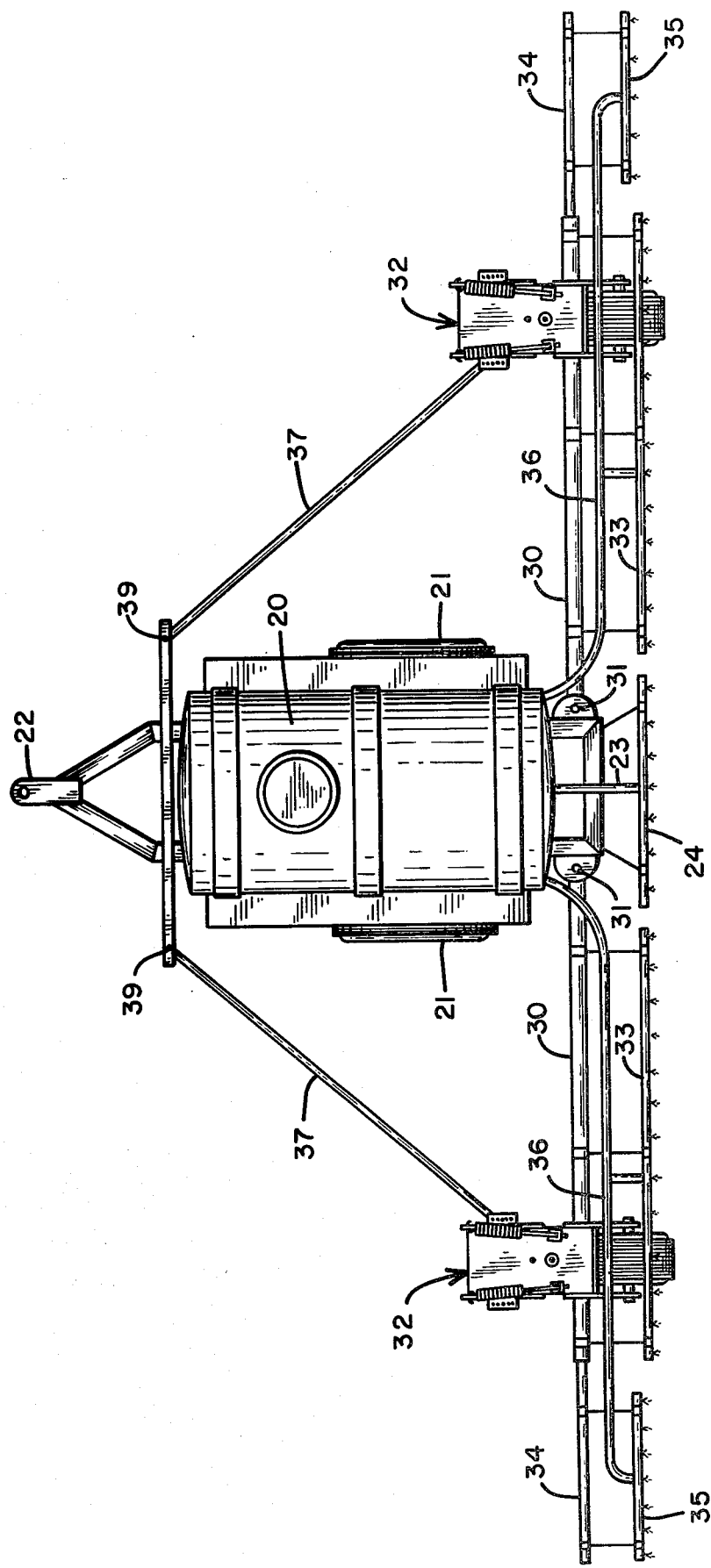
FIG. 1 is a plan view of an implement embodying a pair of wheeled supports according to the invention.

FIG. 1 shows an agricultural implement for dispensing a fluid to the surface of the ground. It comprises a tank unit 20 carried on wheels 21 and having a hitch 22 for coupling to a tractor. Tank unit 20 is pressurized, by means not shown, to deliver fluid through a hose 23 to a first nozzle manifold 24 supported directly behind the tank unit.

A pair of booms 30 are pivotally supported on tank unit 20 at vertical pins 31, and extend over wheeled supports 32 according to the invention. The booms support further nozzle manifolds 33, and are provided with extensions 34 which support still further nozzle manifolds 35. Hoses 36 connect manifolds 33 and 35 with tank unit 20 for supplying fluid to be dispensed. Diagonal braces 37 extend from supports 32 to the front of tank unit 20, where they are pivoted at vertical pins 39.

For dispensing use the structure is as shown in FIG. 1. When it is desired to transport the equipment along a highway, braces 37 are disconnected from supports 32, and booms 30 may then be pivoted to entend directly rearward from tank unit 20.

Figure 3:
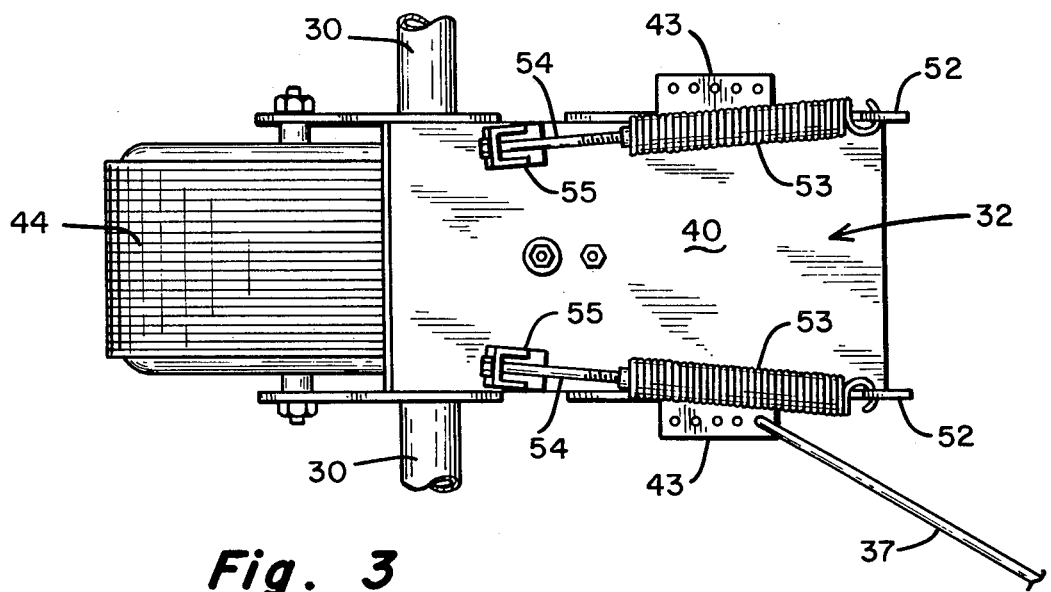
FIG. 3 is a plan view of such a wheeled support.
Figure 2:
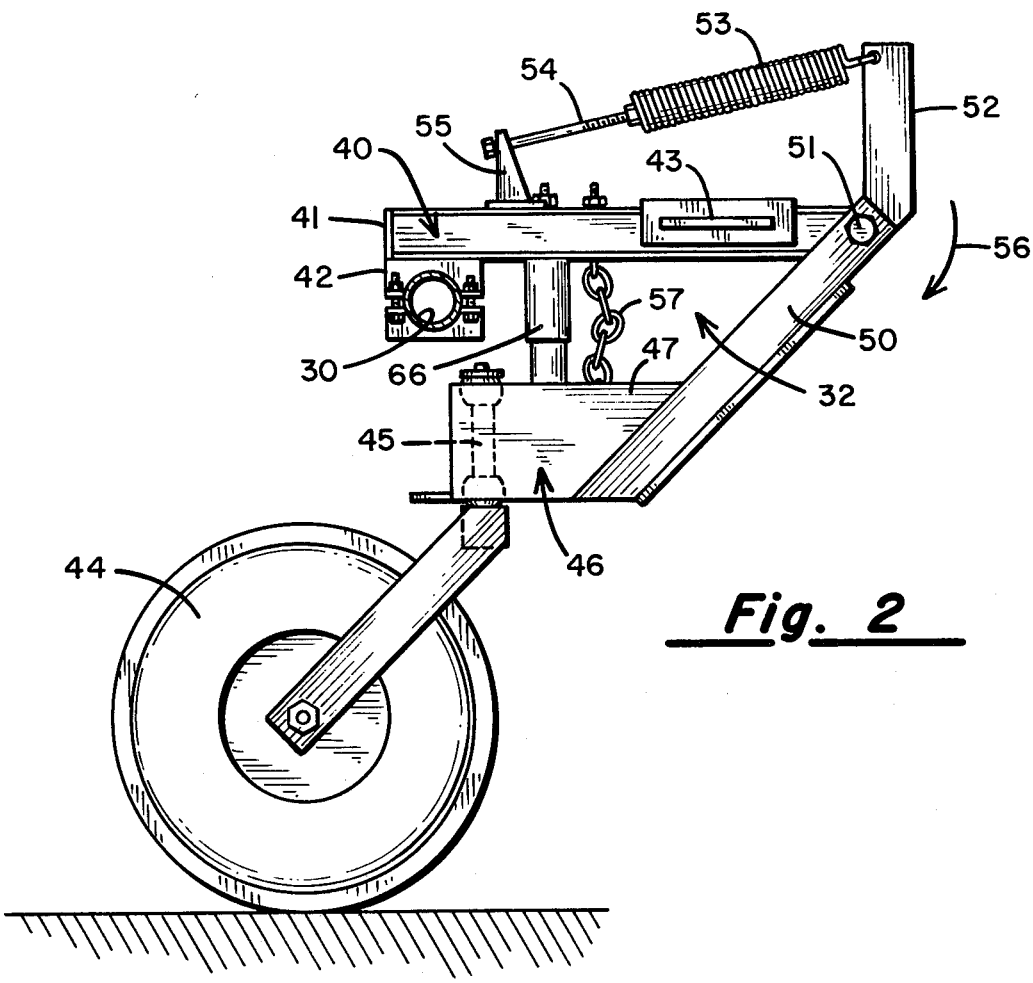
FIG. 2 is a side elevation of such a wheeled support.

The structure a of wheeled support 32 will now be described referring to FIGS. 2 and 3. A normally horizontal platform 40 is supported at one end 41 by a clamp 42 secured to boom 30. Brackets 43 at each side of platform 40 are provided to receive braces 37. A caster wheel 44 is mounted by a swivel 45 in a bracket 46 having a portion 47 extending below and generally parallel to platform 40. Bracket 46 includes a pair of upwardly directed arms 50 which are pivotally connected to the second end of platform 40 at normally horizontal fasteners 51, and which extend beyond the fasteners by angular extensions 52 to receive the first ends of a pair of tension springs 53. The other ends of the springs are connected by rods 54 to brackets 55 carried by platform 40. Springs 53 thus resiliently oppose pivotal movement of bracket 46 about fasteners 51 in the direction of the arrow 56. A chain 57 is connected between platform 40 and bracket 47 to limit pivotal movement therebetween in a direction opposite to that of arrow 56.

A shock absorber 66 is also connected between platform 40 and bracket portion 47, and cooperates with springs 53 to help control and minimize the violence of movement of boom 30 as the implement is drawn over rough ground.

While support 32 has been specifically shown in use with a spray nozzle boom, it is of broader general utility, and can be used where ever a wheeled vehicle is needed to carry a load resiliently and yet with some damping of vibrations resulting from a rough travelling surface.

From the above it will be evident that the invention comprises a wheeled support having resilient and shock absorbing components, alone and in combination with an implement to be transported over the surface of the ground.

Numerous characteristics and advantages of the invention have been set forth in the foregoing description, together with details of the structure on function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

It is claimed:

1. A wheeled support comprising, in combination:
    a generally horizontal support platform having first and second ends;
    securing means at said first end of said platform for fastening said platform to an object to be supported;
    a bracket having a portion below and generally aligned with said platform;
    means connecting said bracket to said second end of said platform for pivotal movement in opposite senses about a first, normally horizontal axis;
    means resiliently opposing said pivotal movement in said first sense;
    shock absorber means connected to said platform and said portion of said bracket and acting therebetween in a plane orthogonal to said first axis; and a caster wheel carried by said bracket for swiveling movement about a second axis orthogonal said first axis.

2. A wheeled support according to claim 1 in which said second axis is generally below said securing means.

3. A wheeled support according to claim 1, further including means limiting said pivotal movement in a second sense opposite to said first sense.

* * * * *